Oct. 26, 1943.  R. L. LORENZ ET AL  2,332,828

TIME CONTROLLED SYSTEM

Filed July 31, 1939  4 Sheets-Sheet 1

FIG.1

INVENTORS
RICHARD L. LORENZ
ERNEST S. OSTLER
ADOLPH L. DENNISTON
BY
ATTORNEY

Oct. 26, 1943.                R. L. LORENZ ET AL                2,332,828
                              TIME CONTROLLED SYSTEM
                              Filed July 31, 1939            4 Sheets-Sheet 3

INVENTORS
RICHARD L. LORENZ
ERNEST S. OSTLER
ADOLPH L. DENNISTON
BY
ATTORNEY

Oct. 26, 1943.  R. L. LORENZ ET AL  2,332,828
TIME CONTROLLED SYSTEM
Filed July 31, 1939   4 Sheets-Sheet 4

INVENTORS
RICHARD L. LORENZ
ERNEST S. OSTLER
ADOLPH L. DENNISTON
BY
ATTORNEY

Patented Oct. 26, 1943

2,332,828

UNITED STATES PATENT OFFICE 2,332,828

TIME CONTROLLED SYSTEM

Richard L. Lorenz, New York, and Ernest S. Ostler, White Plains, N. Y., and Adolph L. Denniston, Plainfield, N. J., assignors, by mesne assignments, to General Time Instruments Corporation, New York, N. Y., a corporation of Delaware Application July 31, 1939, Serial No. 287,518

16 Claims. (Cl. 58—24)

This invention relates to time controlled systems and in particular to a system wherein the operation of a plurality of secondary units is controlled by a master unit in circuit therewith.

In previous corrective time controlled systems of this type, the secondary is corrected during a corrective period which occurs at regular intervals, usually every hour and the maximum slow correction is limited by the number of rapid impulses, usually from fifteen to twenty, which are transmitted to the secondary during this corrective period. The corrective period is generally somewhat less than one minute in length and the number of rapid impulses is limited by slow acting relays in certain types of secondary equipment which necessitates the use of impulses which occur at intervals of about two seconds. Consequently it is seen that under such conditions the number of rapid impulses cannot exceed thirty. Although the maximum correction may be increased by the use of an additional element, an accumulator, we herein disclose a system wherein the maximum slow correction is increased without the use of an accumulator and wherein the maximum correction is not limited by the number of rapid impulses but is cumulative from one corrective period to the next, the maximum correction being somewhat less than the length of the intercorrective period, or the interval between successive corrective periods. For instance, if the secondaries have a sixty minute cycle of operation the maximum corrective period may be forty-four minutes. The maximum fast correction is also cumulative but it is not necessary that it be as great as the maximum slow correction for the reason that correction is necessitated in the majority of instances by a current interruption which causes the secondaries to be behind the master unit, which discrepancy of course is corrected by the slow correction.

Provision is also made in the present system for the use of non-corrective secondaries as well as corrective secondaries. It frequently happens that a time controlled system is changed over from a non-corrective to a corrective system, which change may take several weeks. Consequently it is advantageous to be able to use non-corrective secondary equipment during the change-over until each piece of equipment has been converted to corrective equipment. Of course in some instances it may be preferred to use the old non-corrective equipment in conjunction with new corrective equipment. The commercial advantages of a system which is adapted to operate both the usual type of non-corrective equipment in conjunction with corrective equipment are obvious.

In connection with this system we have also disclosed an improved secondary mechanism of the polarized magnet type. The advantages of this type of secondary mechanism are that no contacts and no electric valves are employed in the secondary. Consequently there is very little opportunity for the secondaries to get out of order or adjustment. In the present secondary mechanism only one electromagnet is used which enables the employment of a two wire system and the construction is such that only a comparatively small permanent magnet is necessary. Furthermore, the secondary mechanism is so designed that it may be set manually whether it be in locked position or not.

In a complete time controlled system there is often included as secondary equipment not only clocks, time stamps and time recorders, but also a program instrument which enables a circuit or circuits to be closed at predetermined times to perform certain functions such as ringing bells, blowing a factory whistle, turning lights off or on, etc. Although the secondary mechanism in the program instrument is substantially identical with the secondary mechanism in the other equipment, considerably modification must be made in the circuit if a satisfactorily functioning program instrument be incorporated therein. In this connection our invention contemplates the provision of a complete time controlled system.

Furthermore, a modified secondary mechanism especially adapted for driving type wheels is also disclosed herein so that time stamps and time recorders may be employed in the complete system.

An object of our invention is to provide an improved corrective time controlled system having an increased maximum correction.

A further object is to provide an improved time controlled system wherein the correction may be cumulative from one corrective period to the next if the chronological discrepancy exceeds the maximum correction for one period.

A further object is to provide an improved two wire time controlled system wherein no electric contacts or valves are present in the secondary apparatus.

A further object is to provide an improved time controlled system wherein both non-corrective and corrective secondary apparatus may be employed.

A further object is to improve and provide an improved secondary mechanism having only one electromagnet and a small permanent magnet.

A further object is to provide an improved secondary mechanism which can be manually set irrespective of whether it is in locked position or not.

A further object is to provide in combination with type wheels an improved secondary mechanism which will exactly center the type wheels.

A further object is to provide a complete time controlled system including a program instrument.

A further object is to provide means for correcting at any time the secondaries in a time controlled system without overwinding the master clock.

A further object is to provide an improved contact mechanism for the master unit of a time controlled system.

Other objects, features and advantages will become apparent as the description proceeds.

Figure 1:
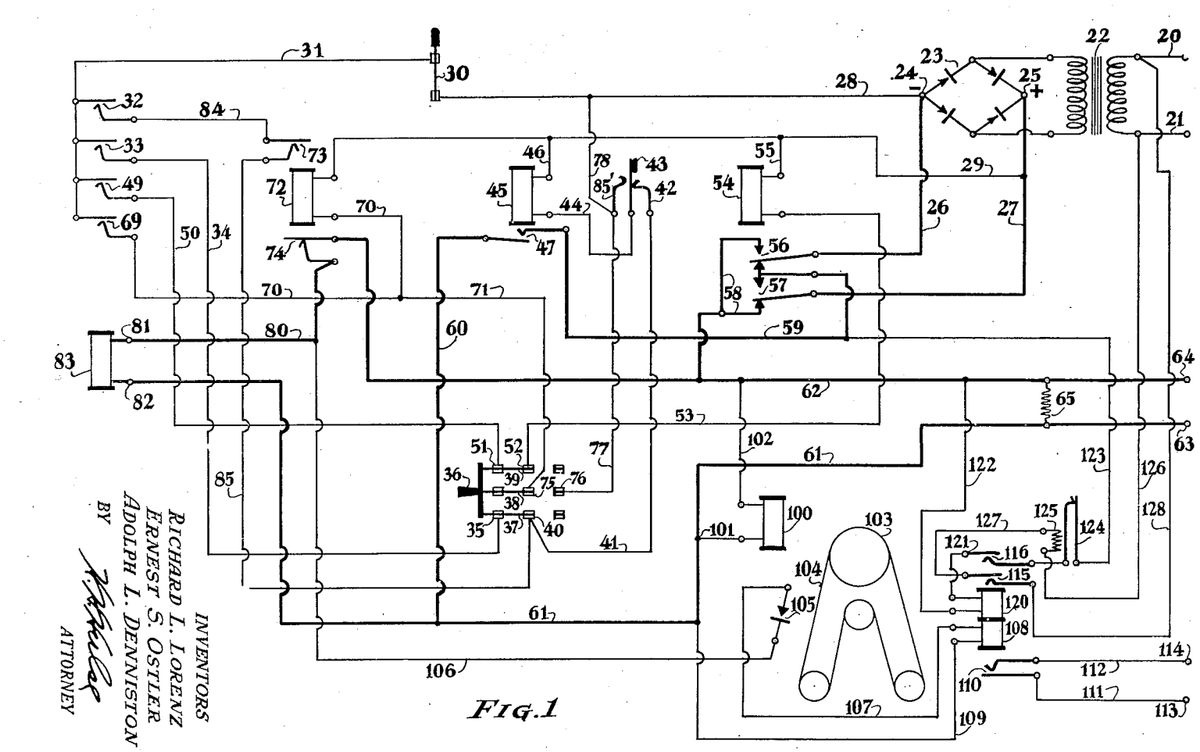
Figure 1 is a circuit diagram of the master apparatus and program instrument.

With reference to Figure 1, reference numeral 22 indicates a transformer, the primary of which is connected to alternating current lines 20 and 21, and to the secondary of which is connected a full wave rectifier 23 which serves to supply at its negative and positive terminals, 24 and 25, direct current for the operation of the master and secondary apparatus. Between conductors 28 and 29, which are in series with the negative and positive terminals 24 and 25, respectively, are positioned various switches, contacts and relays which comprise the master apparatus and cause three types of impulses to be automatically transmitted to the corrective secondaries which are connected in circuit with the master apparatus at terminals 63 and 64, these impulses being locking minute impulses, locking rapid impulses, and non-locking minute impulses. Provision is also made to furnish minute impulses only to non-corrective secondary apparatus which may be connected to the terminals 81 and 82.

A single-throw switch 30 is positioned in series with conductors 31 and 28, the conductor 31 leading to the master clock which actuates contacts 32, 33, 49 and 69 in a manner to be hereinafter described, these contacts being in parallel with conductor 31. Conductor 34 is in series with minute contact 33 and connects the contact with a terminal 35 of a triple-pole double-throw switch 36 having blades 37, 38 and 39. Terminal 40 of switch 36 is connected by conductor 41 to contact member 42. Push button contact 43 is normally biased against contact member 42 and in series with conductor 44 and impulsing relay 45, the other end of the relay being connected to conductor 29 by means of conductor 46. The closing of contacts 33 causes energization of the impulsing relay which operates contacts 47.

A conductor 50 connects polarity reversing contacts 49 to terminal 51 of switch 36. Terminal 52 of the switch is connected with polarity reversing relay 54 by means of conductor 53, the other end of relay 54 being connected to conductor 29 by means of conductor 55. Energization of relay 54 by the closing of contacts 49 operates contacts 56 and 57 which serve to reverse the polarity of the current with which conductors 58 and 59 are energized, conductors 26 and 27 connecting the negative and positive terminals 24 and 25 with the contacts 56 and 57, respectively. As shown in the figure, conductor 59 is negatively energized and is in series with impulsing relay contact 47, which when in the operated position energizes conductors 60 and 61 negatively. Conductor 58 is in series with conductor 62 and with contacts 56 and 57 in the position shown both of these conductors are positively energized. Conductors 61 and 62 are provided with terminals 63 and 64 to which the corrective secondary apparatus may be connected. A high resistance 65 is positioned between conductors 61 and 62 to eliminate arcing of contacts 47, 56 and 57.

Conductor 70 is in series with relay 72, so that the closing of contacts 69 will energize this relay. Terminals 75 and 76 of switch 36 are shunted across contacts 69, conductor 71 connecting terminal 75 and conductor 70, and conductors 77 and 78 connecting terminal 76 and conductor 28 so that when blade 38 is in the opposite position from that shown, relay 72 will be energized. Consequently it will be seen that either operation of contacts 69 or manual operation of switch 36 will cause operation of relay 72.

Energization of relay 72 will close contacts 73 and open contacts 74, contacts 74 being in series with conductors 62 and 80. Terminals 81 and 82 are provided for conductors 80 and 61, respectively, to which terminals a winding magnet 83 for the master clock and non-corrective secondary apparatus may be connected. It will be seen that the circuit to the winding magnet is closed whenever the impulsing relay 45 is energized providing that relay 72 is not energized, but upon energization of the latter relay the opening of this circuit will not effect the circuit through the corrective secondary apparatus which is connected to terminals 63 and 64.

Conductor 84 is in series with contacts 32 and contacts 73, and conductor 85 joins contacts 73 with conductor 41 so that operation of the contacts 32, when relay 72 is energized, will cause energization of relay 45 in the same manner that operation of contacts 33 causes operation of relay 45.

Normally contacts 33 are closed once each minutes for a period of one to two seconds. This causes contacts 47 to be closed and minute impulses to be sent out over both the non-corrective and the corrective circuits. At fifty-two minutes and thirty seconds after the hour, as determined by the position of the minute hand of the master clock, contacts 49 will be closed which will energize polarity reversing relay 54 thereby causing reversal of polarity in both the corrective and non-corrective circuits. Contacts 32 are operated every two seconds, but as contacts 73 are normally open this will not affect the circuit. However, when contacts 69 are closed, which occurs in the period between fifty-nine minutes and twelve seconds after the hour and fifty-nine minutes and forty-eight seconds after the hour, relay 72 will be energized and cause a series of rapid impulses to energize impulsing relay 45 which in turn causes rapid impulses to be transmitted to the corrective circuit. However, as pointed out above, the non-corrective circuit is opened at contacts 74 simultaneously with the closing, at contacts 73, of the circuit between the contacts 32 and the impulsing relay 45 so that these rapid impulses are not transmitted to the non-corrosive circuit.

Operation of single blade switch 30 will disconnect the master clock and cause the cessation of all impulses. Manual operation of push button 43 will open the circuit between the master clock and the impulsing relay and connect this relay directly between conductors 28 and 29 so that for each contact of push button 43 with contact member 85' one impulse will be transmitted to both the corrective and non-corrective circuits.

If switch 36 is thrown to the opposite position from that shown it will be seen that the circuit between contacts 49 and the polarity reversing relay 54 will be opened, thereby rendering that relay inoperative. Blade 38 will connect terminals 75 and 76 which are shunted around contacts 69 and will cause operation of relay 72 which will transmit rapid impulses to the corrective circuit only. The circuit between contacts 33 and impulsing relay 45 will be broken by operation of switch 36 so that impulsing relay 45 will be energized only by the current flowing through contact 32 which of course will cause operation of this relay every two seconds.

The program instrument itself is of the standard construction, and comprises a corrective secondary apparatus, represented here by magnet 100, which drives a drum 103, the latter in turn driving a tape 104 which is perforated in positions which represent certain times. As the perforated portions of the tape move past a fixed point, they permit operation of contacts 105 at predetermined times. Operation of the contacts causes energization of relay winding 108, the winding and contacts being connected to the non-corrective circuit by means of conductor 106 which is in series with conductor 60 and contacts 105, conductor 107 which is in series with contacts 105 and winding 108, and conductor 109 which is in series with winding 108 and conductor 61. Energization of winding 108 causes operation of contacts 110 which are in series with conductors 111 and 112, each of which are provided with terminals 113 and 114 to which a bell or other controlled circuit, including a source of power, may be connected.

A holding circuit, including conductor 122, relay winding 120, conductor 121, contacts 116, thermal break 124, and conductor 123 is provided, conductors 122 and 123 being connected to conductors 62 and 59, respectively. A control circuit for the thermal break, including conductor 128, contacts 115, conductor 127, heating element 125 and conductor 126 is provided, the conductors 128 and 126 being connected across alternating current lines 20 and 21, respectively.

The secondary apparatus including magnet 100 is connected into the corrective circuit by means of conductors 101 and 102 extending from conductors 61 and 62, respectively.

When contacts 105 are closed by the program instrument, relay winding 108 will not be energized until the next succeeding impulse that is transmitted over the non-corrective circuit, and then it will be energized only for a period of one to two seconds, depending on the length of time that impulsing relay 45 and contacts 33 are operated. Energization of relay winding 108 will cause operation of contacts 110, 115 and 116. Operation of contacts 110 closes the bell circuit. Operation of contacts 116 closes the holding circuit which will hold the contacts 110 in closed position after the de-energization of winding 108. Operation of contacts 115 closes the thermal break control circuit which will operate the thermal break to open the holding circuit, thus causing the opening of all the contacts 110, 115 and 116.

Consequently, it will appear that by regulating the action of the thermal break and the effectiveness of the heating element, one can regulate the length of time during which the bell circuit is closed, despite the fact that the circuit through contacts 105 is closed for less than two seconds.

It will be noted that there are four separate circuits in the program instrument; the secondary circuit, which is bridged across the corrective circuit; the tape controlled relay circuit, which is bridged across the non-corrective circuit; the holding circuit, which is bridged across a source of direct current, of which the polarity is the same as that of the non-corrective circuit, and the thermal break control circuit which may be bridged across the alternating current supply circuit.

Figure 2:
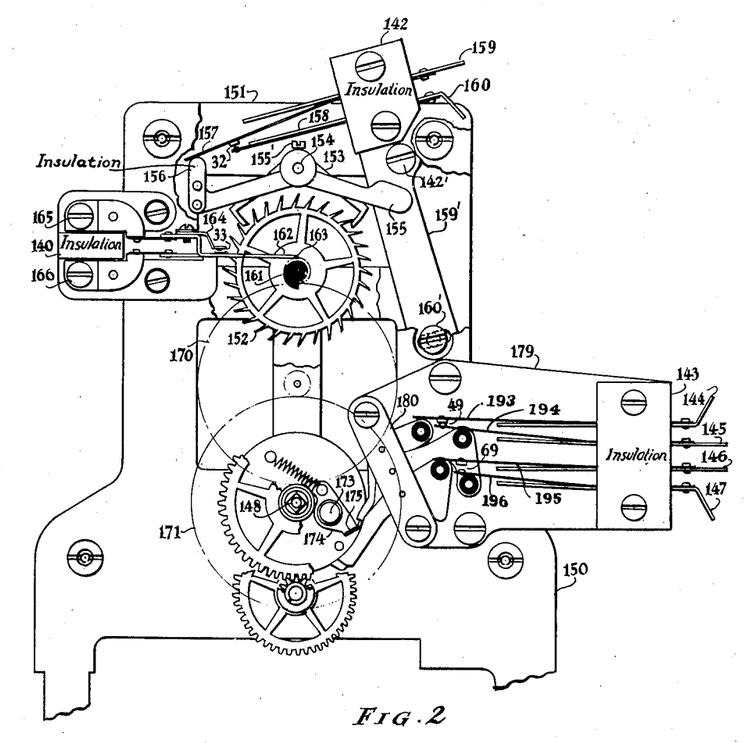
Figure 2 is an elevation of the master clock showing in detail the contacts actuated thereby.
Figure 3:
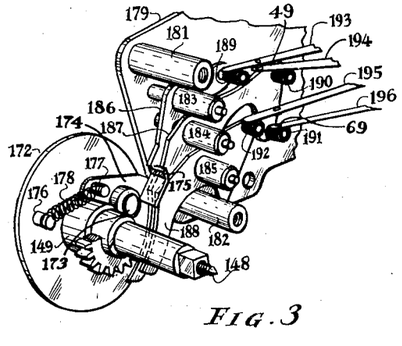
Figure 3 is a detailed perspective view of the reversing and rapid relay contact actuating apparatus.

With reference now to Figures 2 and 3, reference numerals 150 and 151 represent the front and rear plates of the master clock which comprises a pendulum controlled movement of one beat per second of the usual construction. An escapement wheel 152 is suitably positioned between the plates and a verge 153 is provided to cooperate with it, the verge being mounted on shaft 154 with which the pendulum is associated. Also, rigidly affixed to verge shaft 154 is an arm 155 having at one end thereof an insulating member 156 which is adapted to oscillate with the pendulum. A resilient contact member 157 is suitably associated with conducting member 159 which is anchored in insulation block 142 and cooperates with a second contact member 158 which is similarly associated with a conducting member 160 also anchored in insulation block 142. Contacts 32 are carried by contact members 157 and 158, the former being biased toward the latter so that each time that the pendulum makes a complete swing, that is every two seconds, the contacts 32 will be made.

A set screw 155' through the hub attached to arm 155 permits relative setting of the arm to the contacts 32, so these may be made at a predetermined point of the pendulum's arc of swing and also that contacts 32 may be fixed in a definite, though selective, time of duration. Cooperating with the above feature is a plate 159', pivotally clamped by screw 142' to the plate 151, said plate 159' carrying insulation block 142 with its attached contact members 159, 160, 157, 158. Plate 159' has an elongated slot at its lower extremity which extends in a lateral plane in respect to its pivot point at 142'. The purpose of this slot is to permit angular movement of plate 159' about pivot 142' so same may be co-ordinated to the setting of arm 155 about shaft 154, thereby effecting an adjustment to contacts 32 to determine the time and duration of make and break relative to the swing of the pendulum.

A cam 161 of suitable insulating material is associated with the escapement wheel 152. Members 162 and 163 are resiliently mounted on conducting members 165 and 166 which in turn are mounted on insulation block 140. It will be noted that member 162 is somewhat shorter than member 163 and that it is also provided with an arm 164 which extends backwardly in overlapping relationship to member 163, the members 164 and 163 being provided with contacts 33. As the cam rotates in the clockwise direction, member 162 will drop off the face of the cam a little less than two seconds before member 163 will drop, thereby causing contact 33 to be made.

The escapement wheel 152 is driven by wheel 170 which in turn is driven by wheel 171 which is mounted on shaft 148. Shaft 148 rotates once an hour and the gear ratio between it and the escapement wheel is such that the escapement wheel rotates once every minute. A disk 172, associated with the wheel 171 on shaft 148, likewise makes one revolution per hour. Pin 173 is carried on disk 172 on which pin is journaled an arm 174, the arm having its outer end turned up as at 175 so that one portion of the turned up end presents a cylindrical surface with respect to shaft 148. A pin 176 is positioned on disk 172 and another pin 177 is positioned on arm 174, a coil spring 178 having either end thereof associated with these pins so that the arm 174 is tensioned in the counterclockwise direction, one end of the arm abutting against the hub 149 of disk 172 as shown in the figures so that normally the position of the arm is such that the outer end 175 is approximately coincident with the edge of the disk 172.

A plate 179 is mounted on plate 150 and a member 180 is associated with the plate by means of pillars 181 and 182. Shafts 183, 184 and 185 are journaled in plates 179 and 180, lever 186 being affixed to shaft 183, lever 187 being affixed to shaft 184 and lever 188 being affixed to shaft 185. A pin 189 formed of insulating material is mounted on one end of lever 186 and similar pins 190 and 191 are positioned on lever 187, and a similar pin 192 on lever 188. Resilient contact members 193, 194, 195 and 196 rest on pins 189, 190, 192 and 191, respectively, and urge levers 186, 187 and 188 in the clockwise direction so that the opposite ends thereof will extend out over disk 172 and into the path of turned up end 175 of arm 174. As the disk rotates in the clockwise direction the turned up end 175 of arm 174 will contact all three of the levers simultaneously and displace them to an equal extent in the counterclockwise direction, but lever 186 is of such a length that as the member reaches a position corresponding to the position of the minute hand at fifty-two minutes and thirty seconds after the hour, lever 186 will become disengaged from member 175 permitting the resilient member 193 to drop down and contact the resilient member 194 thereby making the contacts 49 at this time. When member 175 shall further rotate sliding along the levers, the edges of which are curved so that no further displacement of the levers will occur, to a position corresponding to the position of the minute hand at fifty-nine minutes and twelve seconds after the hour, lever 188 will become disengaged from the member 175 permitting the resilient member 195 to drop down into contact with resilient member 196, thereby making the contacts 69. Thirty-six seconds later the arm 187 will become disengaged from member 175, allowing displacement of this lever in a clockwise direction by resilient members 194 and 196, thereby causing contacts 49 and 69 to be broken.

Resilient members 193 to 196 are associated with conducting members 144 to 147, respectively, which are anchored in insulating block 143.

The pivotal mounting of arm 174 on disk 172 permits the arm to be rotated in a clockwise direction with respect to the disk in opposition to the tension of spring 178. This permits the disk 172 to be rotated in the counterclockwise direction which is occasionally necessary in setting the master clock. During this counterclockwise rotation of the disk it will be seen that the member 175 will contact the ends of levers 186 to 188 and be rotated with respect to the disk until the radial distance between member 175 and shaft 148 has been reduced to an extent that the arm may trip over the ends of each of the levers in succession without preventing the counterclockwise rotation of the disk.

The driving mechanism for certain types of secondary apparatus such as a secondary clock is shown in Figures 4 to 7, inclusive, and comprises frame plates 200 and 201 which are suitably spaced from each other by pillars 202. A cross member 203 is associated with the plates and supports magnets 204 and 205 which are provided with cores 206 and 207, respectively, the member 203 being of magnetic material similar to the cores and providing a path for the magnetic flux of the magnets. An armature 208 of magnetic material is carried by a lever 250 which is suitably affixed to shaft 209 journaled in plates 200 to 201. A plate 250', also affixed to shaft 209 and spaced by pillars 256 and 257, lends additional support to armature 208, said armature being rigidly held against movement in respect to plate 250' and lever 250 by rivet 258, which passes through armature 208 and pillar 256. A pawl 252 depends from pin 251, which is affixed to lever 250, and on which it is pivotally mounted, and is provided at its outer extremity with a pin 253 which engages the ratchet wheel 212 mounted on shaft 211 which is journaled in the plates 200 and 201. A gear wheel 213 having spirally cut teeth is also mounted on shaft 211 and meshes with a spiral gear 214 on shaft 215 which shaft extends at right angles to shaft 211 and is suitably journaled in plates 254 and 255. An operating spring 210 is tensioned between pin 259 in plate 201 and armature carrying arm 250 to urge the arm in the clockwise direction. It will be seen, consequently, that when the magnets 204 and 205 are energized the armature 208 will be drawn up rotating arm 250 against the bias of spring 210 causing the pawl to ride over one tooth of the ratchet, and upon de-energization of the magnets the spring 210 will cause rotation of arm 250 in a clockwise direction which in turn will cause the pawl to rotate the ratchet wheel 212 in the clockwise direction to the extent of one tooth. A retaining pawl 232 cooperates with ratchet wheel 212 to prevent counterclockwise rotation of the same while the pawl 232 is being retracted over the teeth of the ratchet.

Figure 4:
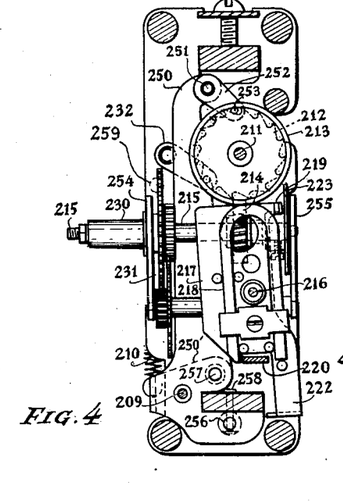
Figure 4 is a side sectional elevation of a preferred form of a secondary apparatus.
Figures 5, 6:
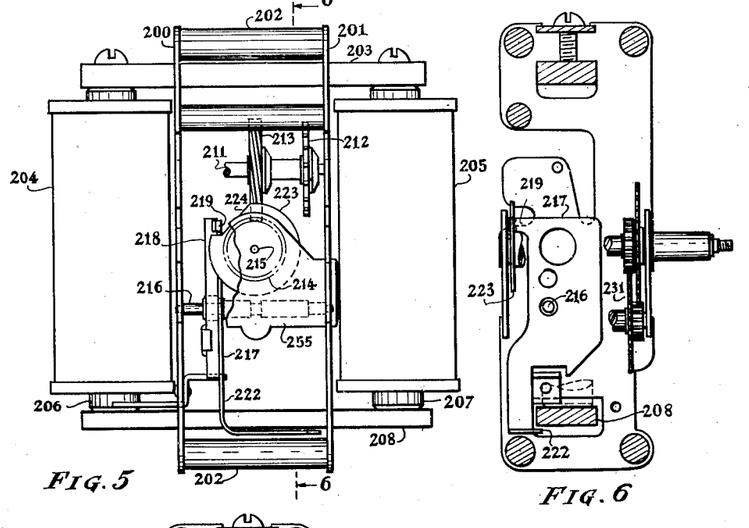
Figure 5 is an elevation of the same during another stage of its operation, certain parts being omitted for the sake of clarity.
Figure 6 is a broken sectional elevation of certain parts taken along line 6—6 of Figure 5.
Figure 7:
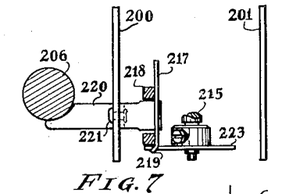
Figure 7 is a detailed plan section of a portion of Figure 5.

An auxiliary pole piece 220, which comprises a strip of magnetic material, one end of which is in contact with end of core 206, is mounted on plate 200 by means of a rivet 221. The plates 200 and 201 are of non-magnetic material. A shaft 216 is journaled in plates 200 and 201 and affixed to the shaft is a plate 217 on which is mounted a small permanent magnet 218. The auxiliary pole piece 220 extends inwardly from plate 200 to a position between the two poles of the permanent magnet 218. It is evident, therefore, that when magnets 204 and 205 are energized with current of one polarity that the plate 217 will be caused to rotate in one direction, and upon a subsequent energization of the magnets 204 and 205 by current of opposite polarity, the plate 217 will be rotated in the opposite direction. A projection 222 is provided at the lower end of the plate which is adapted to engage the under side of armature 208 when the current is of reversed or locking polarity, this projection being shown in Figure 6. A second projection 219 is formed at an upper corner of plate 217 and is adapted to abut against a disk 223 which is affixed to shaft 215 and rotates with it at the rate of one revolution per hour. The disk has a peripheral cutaway portion 224 which permits the plate to be rotated in the clockwise direction from the position shown in Figure 4 when the current is of locking polarity. However, it will be seen that normally the plate remains in the position as shown in Figure 4 wherein the projection 219 abuts against the rotating disk and the projection 222 is disengaged from the armature 208. When the disk 223 is rotated to a position corresponding to fifty-nine minutes after the hour as determined by the position of the minute hand on the dial of the secondary clock and as shown in Figure 5, the plate will rotate in the clockwise direction and lock the armature in its operated position as shown in Figure 6.

The minute hand of the secondary clock may be mounted on the end of shaft 215, which normally makes one revolution per hour. A sleeve 230, surrounding shaft 215, is driven by suitable reduction gearing, here designated generally by reference numeral 231, and provides means on which the hour hand may be mounted.

If the above described secondary be connected into the corrective circuit, it is evident that impulses of normal or non-locking polarity will cause the ratchet wheel to be moved one tooth for each impulse. Beginning with the fifty-third impulse after the hour the minute impulses are of reversed or locking polarity. The ratchet wheel will still be advanced provided that the cutaway portion 224 of disc 223 has not been rotated to a position wherein it is opposite projection 219. When the disc has been rotated to such a position, it no longer blocks rotation of plate 217, and the plate moves to locked position upon receipt of a locking impulse. In other words, the secondary will be locked only upon the concurrence of two events; the receipt of a locking impulse and the positioning of the disc 223 so that the locking mechanism is operative, the latter being referred to as locking positions as contrasted with a locked position of the secondary.

It will be observed that projection 222 is a resilient member to permit of manual reciprocation of the armature during locked position to cause rotation of ratchet 212 and disc 223. Projection 219 is bent to form a cam surface so that during such manual operation of the secondary when in locked position, the rotating disc may displace the projection 219 and plate 217 to the unlocked position. This construction is desirable as it permits of manual setting of the secondary at all times by reciprocation of the armature alone, without regard to the locking mechanism.

When the magnets 204 and 205 are energized, the figures indicate a space between projection 222 and armature 208. As the motion of the locking member from locked position to unlocked position, and vice versa, occurs only during energization of magnets 204 and 205, the armature will never bear against the projection or locking member during the motion of the latter, and hence cannot hinder the free movement thereof. This construction permits of the use of a very small permanent magnet because the friction between the armature and the locking member is eliminated.

Although the discs 223 assumes sixty different positions in the course of a complete revolution, the use of the spiral gears 213 and 214 permits the use of a ratchet wheel of comparatively few teeth and of a smaller size, which in turn reduces the overall dimensions of the secondary mechanism considerably.

Although various methods of timing of the different types of impulses and the action of the secondary have been resorted to in the past, and although this type of system is operative when only one locking position is provided for the secondary in each cycle of operation, and when only one non-locking impulse is transmitted during each cycle of operation of the master, we have found that superior results are obtained by providing a plurality of locking positions for the secondary and by increasing the number of non-locking minute impulses to a majority of all the minute impulses. The timing is such that in normal operation, the locking positions overlap the locking impulses only during the transmission of the rapid locking impulses.

As an example of the timing that may be used, the locking positions of the secondary may be from the fifty-ninth through the seventh minute positions of the secondary, a total of nine positions, leaving fifty-one non-locking positions extending from the eighth through the fifty-eighth minute positions. The master clock may transmit non-locking impulses from the sixtieth through the fifty-second minute, a total of fifty-three non-locking minute impulses, and may transmit from the fifty-third through the fifty-ninth minutes, a total of seven locking minute impulses. Between 59:12 and 59:48 minutes after the hour, approximately eighteen rapid locking impulses may be transmitted at two second intervals.

When the secondary is on time with the master clock, it will not be locked by any of the locking minute impulses. Because the clock is actually advanced by the operating spring 210, the disc 223 will not be moved into the fifty-ninth minute position, or the first locking position, until de-energization of magnets 204 and 205 subsequent to energization thereof by the fifty-ninth minute impulse. Upon receipt of the first rapid locking impulse, however, at 59:12 minutes after the hour, the armature 208 will move to the operated position permitting projection 222 to slide thereunder and lock it in that position, the disc 223 having been moved into locking position subsequent to the preceding impulse. The remainder of the rapid locking impulses will not advance the locked secondary. The sixtieth minute impulse, being a non-locking impulse, will withdraw projection 222 from under the armature and projection 219 from the cutaway portion of the disc 223, and the operating spring, having been tensioned continuously during the locked position of the secondary, will advance the now unlocked secondary to the sixtieth position upon de-energiaztion of magnets 204 and 205.

If the secondary is five minutes fast, it will be moved into the fifty-ninth position by the fifty-fourth impulse. The fifty-fifth impulse will lock it in the fifty-ninth position and it will remain locked until the sixtieth impulse. If the secondary is slow by five minutes, it will be moved into the fifty-ninth position by the fifth rapid impulse and locked by the sixth in that position, thus correcting it. If the secondary is forty-four minutes slow, it can be corrected only to the extent of approximately eighteen minutes during one corrective period, so that after the sixtieth impulse, it will be twenty-six minutes slow. During the next corrective period, it will be corrected approximately another eighteen minutes, so that during the third hour it will be only eight minutes slow and this error will be completely eliminated during the subsequent corrective period.

If the secondary clock is fifteen minutes fast, it will be moved into the seventh position by the fifty-second impulse. The seventh position being a locking position, the fifty-third impulse, which is a locking impulse, will lock the secondary until the receipt of the sixtieth impulse unlocks and advances it to the eighth position. The secondary is now eight minutes fast, and fifty-three minutes later, it will be locked in the sixtieth position for seven minutes, and on the sixtieth impulse will be moved to the first position. This one minute error will be corrected during the subsequent hour.

Figure 8:
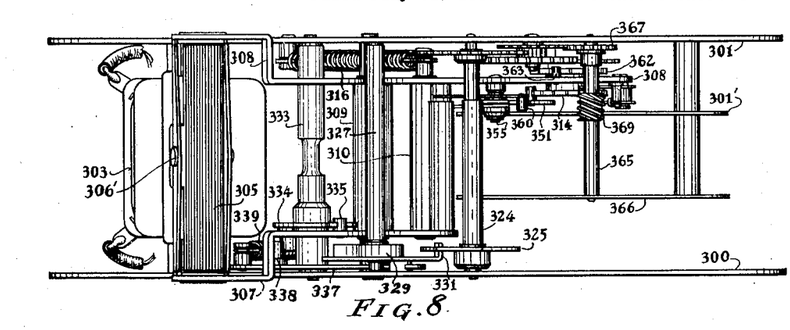
Figure 8 is a plan view of another type of secondary apparatus.
Figure 9:
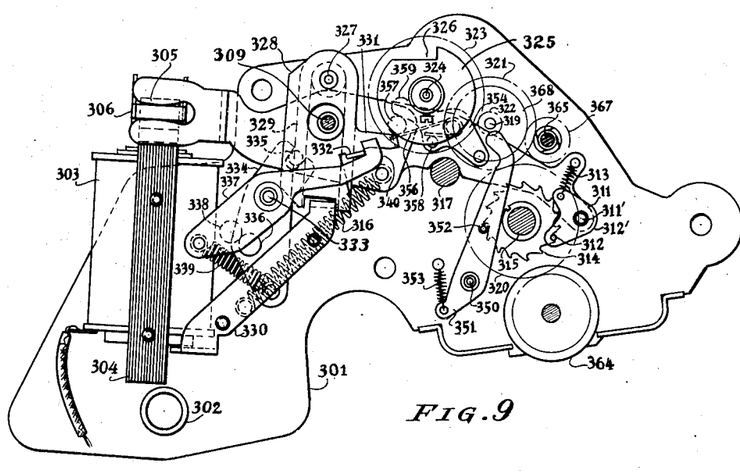
Figure 9 is an elevation of the same.
Figure 10:
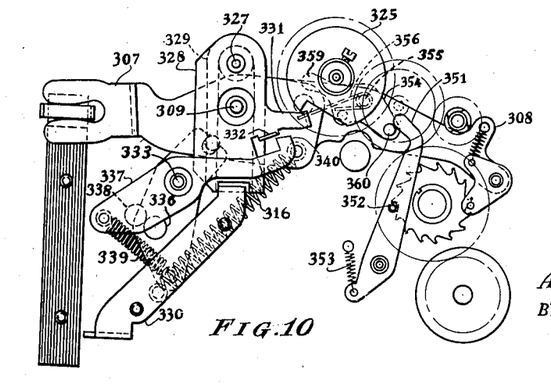
Figure 10 is a view similar to Figure 9 taken at another stage of the operation thereof.

A time stamp is shown in Figures 8, 9 and 10 which embodies a modified form of the secondary mechanism which has been shown in the preceding figures. The plates 300 and 301 form the head of the time stamp and are spaced from each other by suitable pillars (not shown). A shaft may be passed through bushings 302 in plates 300 and 301, said shaft being journalled in a suitable support and forming the pivotal point of oscillation of the head. An electromagnetic winding 305 is suitably mounted between the plates and is provided with a laminated core 304. A laminated armature 305, cooperates with the core and is furnished with a lateral rocking member 306 which swivels about a pin 306', said pin passing through the rocking member 306 and armature 305. At the outer extremities of rocking member 306, cross members project to engage the inner edges of the forked armature holders 307 and 308. A shaft 309 is journaled in the plates 300 and 301 and the armature holders are affixed to the shaft. One or more spacing members 310 may also be used to give rigidity to the assembly comprising the two armature holders and the armature. Holder 308 is extended further to the right than holder 307 and terminates in a pawl arm 311 which carries thereon a pin 311' affixed to it, said pin in turn, forming the pivoted point for a pawl 312', having at its lower extremity a pin 312 affixed, this latter pin lying in engagement with a ratchet wheel 314 and urged in this position by a spring 313, suitably positioned between the two. Ratchet wheel 314 is affixed to shaft 315, suitably journaled in the plates 301 and 301'. An operating spring 316 is connected at either end thereof to holder 308 and plate 301 to urge the holder in the clockwise direction. One of the spacing pillars 317 serves as a stop to limit the motion of the armature holder in the clockwise direction. It will be seen that when the electromagnetic winding 303 is energized the pawl pin 312 will be drawn over one tooth of the ratchet wheel so that upon de-energization of the magnet, the ratchet wheel will be advanced by the operating spring a distance equivalent to the space between two adjoining teeth.

A wheel 320 is also mounted on shaft 315 which drives wheel 321 and pinion 322 mounted on a stud 319. Pinion 322 drives wheel 323 which is mounted on a shaft 324 suitably journaled in the plates. A disk 325 is also affixed to shaft 324 and is formed with a cutaway portion 326 in the periphery thereof. Shaft 327 is also journaled in the plates and affixed thereto is a plate 328 which has suitably mounted thereon a small permanent magnet 329. An auxiliary pole piece 330 extends from the core 304 upwardly adjacent the non-magnetic plate 300 and projects backwardly into the space betwen the two poles of the permanent magnet 329. A projection 331 on plate 328 is adapted to contact the periphery of the disk 325 and when the cutaway portion 326 is opposite the projection 331 it will be seen that the assembly comprising the plate 328 and the permanent magnet 329 will be rotated in a counterclockwise direction as shown in Figure 10 when the polarity of the auxiliary pole piece is such that it attracts the left-hand pole of the permanent magnet. If the polarity is such that it attracts the right-hand pole, the projection 331 will be drawn from the cutaway portion of the disk. A second projection 332 is formed on plate 328, the bottom surface of this projection being substantially perpendicular to a radial line between this projection and shaft 327.

A shaft 333 has fixed thereon a forked lever 334, the forked portion of which embraces a pin 335 mounted on armature holder 307. A pin 336 is also postioned on the lower portion of lever 334 which is adapted to cooperate with the pin 338 mounted on lever 337 which is pivoted on shaft 333 so that displacement of lever 334 in the clockwise direction will cause displacement of lever 337 in the clockwise direction. A spring 339 joins the extremities of these two levers to bias the second against the first. Lever 337 has an up-turned end 340 which is of such length as to just clear the projection 332 on plate 328 when the plate is in the position shown in Figure 9. It will be seen, consequently, that as the winding 303 is energized by non-locking impulses, which advance the ratchet wheel 314 step by step, that lever 337 will oscillate about shaft 333, just clearing the right-hand end of projection 332. However, when the winding is energized by locking impulses, that is by impulses of reversed polarity, the plate 328 tends to rotate in the counterclockwise direction and when disk 325 has rotated in the clockwise direction from the position shown in Figure 9 to the position shown in Figure 10 in which the cutaway portion is opposite the projection 331, the plate will be permitted to rotate counterclockwise sufficiently to move projection 332 into a position where it blocks the up-turned end 340 of lever 337. Figure 10 shows the mechanism with the magnet 303 energized and the plate 328 rotated into a position wherein projection 332 lies in the path of the up-turned end 340 of lever 337. Thus, when the magnet de-energizes at the end of the impulse, the armature lever is rotated clockwise, pin 335 moves levers 334 and 337 in a counterclockwise direction until the end 340 engages projection 332, thus locking the armature 305 and the armature holders so that further locking impulses will not rotate the ratchet wheel.

Spring 339 is considerably stiffer than spring 316 so that after the magnet has been de-energized and the end 340 is in engagement with lug 332, spring 316 is urging the lever 308 in a clockwise direction but is not strong enough to overcome the tension of spring 339 and the armature therefore remains in its locked position. Spring 339 is provided between members 334 and 337 to permit a manual advance of the type wheels in case this should become necessary during the time that the armature is in its locked position. Thus, with the mechanism in the locked position, the armature and lever 308 may be grasped manually and rotated in a clockwise direction to advance the type wheels, provided sufficient force is supplied to overcome the tension of 339. This permits manual advance of the type wheels during the locked position without damage to the mechanism.

A shaft 350 suitably journaled in the plates has affixed to it a retaining pawl arm 351 which carries retaining pawl pin 352, this pin being adapted to cooperate with the teeth of ratchet wheel 314 to prevent the counterclockwise rotation thereof as the pawl 312 is drawn over the ratchet upon energization of the winding 303. A spring 353 urges the retaining pawl against the ratchet wheel. A pivoted member 354 is mounted by means of stud 355 on armature holder 308 and is biased by a spring 356 in the counterclockwise direction, the ends of the spring bearing against a pillar 357 mounted on holder 308 and a pin 358 mounted on pivoted member 354. Pivoted member 354 has a projection 359 formed at one end thereof which bears against pillar 357 to limit the counterclockwise rotation thereof. A pin 360 on pivoted member 354 extends laterally therefrom and is adapted to engage the upper end of the retaining pawl arm 351 when the armature holder is rotated by energization of the magnet to force the retaining pawl against the ratchet wheel.

On shaft 315 is mounted an overthrow ratchet wheel 362 of the same size as ratchet wheel 314 but with the teeth pointed in the opposite direction. A pin 363 mounted on holder 308 is adapted to cooperate with the ratchet wheel 362 when the holder is in the unoperated position shown in Figure 9.

Suitably mounted type wheels 364 are driven by wheel 320. A shaft 365 which is suitably journaled in plates 301 and 366 has a pinion 367 mounted thereon which is driven by gear 368 mounted on stud 319. A spiral gear 369 is affixed to shaft 365, this spiral gear being adapted to mesh with a suitable gear to drive the clock hands with which a time stamp is usually provided.

As in the case of the previously described modification, it is desirable that there be a slight motion of the armature and of the armature holder upon energization of the winding, even though the armature is in the locked position. This slight motion disengages the up-turned end 340 from projection 332 so that there will be no pressure on the latter to prevent the plate 328 from moving to the left upon receipt of a nonlocking impulse. This slight motion of the armature holder in the locked position will cause the pawl 312 to ride up and down the surface of the ratchet tooth which will tend to rotate the ratchet in the counterclockwise direction. The retaining pawl 352 is adapted to prevent this counterclockwise rotation.

When type wheels are provided in combination with a secondary apparatus, it is essential that the type be exactly centered and that it be rotated a definite amount by each impulse. The position of the retaining pawl pin 352 with respect to the ratchet tooth is shown in Figure 10, causing exact positioning of the type wheel when the winding is energized or when the apparatus is in the locked position. The vibration accompanying operation of the time stamp when it is locked is likely to cause a clockwise rotation of the ratchet wheel which the tension of spring 353 is not sufficient to prevent. For this reason pivoted member 354 is resiliently mounted on the armature holder so that it will engage the arm 351 and force the retaining pawl to the right with sufficient force so that the ratchet will seek one definite position with respect to the retaining pawl. It will be seen that the pivoted member 354 is resiliently mounted so that essentially it is the tension of spring 356 which is added to the tension of spring 353 to cause the positioning of the ratchet wheel. As the winding 303 is de-energized so as to permit the operating spring 316 to cause rotation of the ratchet wheel, pin 360 on pivoted member 354 is disengaged from the arm 351 so that only the force of spring 353 urges the retaining pawl into engagement with the ratchet wheel, this force being sufficiently small to permit the ratchet to slip over the retaining pawl to the extent of one tooth. As the armature holder returns to its unoperated position the over-throw pin 363 engages the overthrow ratchet 362 to prevent the energization of the mechanism from carrying the ratchet wheel beyond the position shown in Figure 9 so that the type wheels may be advanced exactly the predetermined distance.

Figure 11:
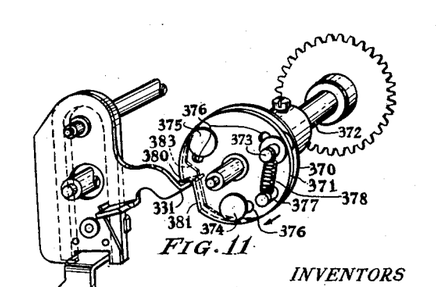
Figure 11 is a detail in perspective of a mechanism to selectively provide setting of the secondary shown in Figure 9 when same is in locked position.

The time stamp shown and described above is adapted to be manually set ahead only by manual reciprocation of the operating lever 308. A modification is shown in Figure 11 by means of which the time stamp may be set either forward or backward manually by means of a key as is the usual practice in time stamps which are commercially in use at the present. To effect manual setting of the printing wheels, clutch means are provided between the ratchet wheel 314 and the gear wheel 329 which clutch means are fully described and shown in co-pending application Serial No. 651,243, now Patent No. 2,214,796, issued September 17, 1940. The clutch means are declutched by the insertion of the key which when rotated drives the type wheels 364 and it also drives the gear train comprising gear 321, pinion 322 and gear 323, the latter gear being affixed to shaft 324 on which is also mounted the disk 325. The disk as shown in Figures 8 to 10 may be rotated in the clockwise direction at any time, but the shoulder formed by the cutaway portion 326 prevents counterclockwise rotation thereof. As shown in Figure 11 a second disk 370 is provided of slightly larger diameter than disk 371, which latter disk corresponds to disk 325 in the previous figures, the disk 370 being affixed to shaft 372 to rotate therewith at all times. Disk 370 has three studs 373, 374 and 375 extending from a face thereof, these studs extending through slots 376 correspondingly positioned in disk 371 and the heads of the studs retaining the disk 371 but permitting rotation thereof with respect to disk 370. The disk 371 is loosely mounted on shaft 372 and is adapted to be rotated by engagement of the studs with the disk. A stud 377 is located on a face of disk 371 and a spring 378 is affixed at either end thereof to studs 377 and 373, the spring serving to maintain a definite relationship between the two disks, but permitting the disk 370 to be rotated in the counterclockwise direction in opposition to the spring if the disk 371 be blocked against rotation.

Disk 371 is provided with a shoulder 380 formed by cutaway portion 381, which correspond in function to the shoulder and cutaway portion 326 in disk 325 during normal operation. When the time stamp is manually set back, disk 371, although it is not affixed to shaft 372, will rotate with disk 370, which is affixed to the shaft, until projection 331 engages shoulder 380, thereby blocking disk 371. Further rotation of disk 370 beyond this point will cause cam surface 383 to force the projection 331 off of shoulder 380, the cam surface being formed on the periphery of disk 370. As soon as this takes place the spring 378 will cause the disk 371 to be rotated in the counterclockwise direction to its normal position with respect to disk 370. Although projection 331 will continue to bear against the periphery of disk 370 it will not block further counterclockwise rotation of either disk or of the shaft 372. It will thus be seen that by the use of the second disk, 370, that the type wheels may be rotated either forwardly or backwardly by manual rotation of wheel 320 when the clutch between wheel 320 and the ratchet wheel 314 is disengaged.

In the corrective system herein described, the master and secondary apparatus each have a cycle of operation of sixty minutes. It is obvious that this cycle of operation may be increased or decreased without departing from the spirit of our invention. The intervals at which the so-called minute impulses and rapid impulses are transmitted may similarly be changed; for instance with an eighty beat per minute master clock, the rapid impulses could be transmitted every one and one-half seconds.

Furthermore, the number of locking positions in each cycle of operation of the secondary, or the number of locking minute impulses, or the number of locking rapid impulses in each cycle of operation of the master clock may be increased or decreased, with corresponding changes in the maximum hourly and maximum cumulative correction or corrective range. The maximum hourly slow correction is equal in number of minutes to the number of rapid impulses, and the maximum hourly fast correction is equal in number of minutes to the number of locking minute impulses. In general, increasing the number of non-locking minute impulses or decreasing the number of locking positions will increase the maximum cumulative slow correction for most positions of the hands. A complementary relationship exists between the maximum cumulative fast and slow ranges; an increase of one causes a decrease of the other.

It is considered more desirable to favor the slow correction at the expense of the fast as impulse driven secondaries do not usually gain time but are likely to lose time due to current interruptions.

Although a plurality of locking positions is not necessary to cause the cumulative slow correction, and the provision thereof will actually shorten the maximum cumulative slow correction over the correction afforded by a single locking position, it does permit a fast correction when the hand of the master clock is set back several minutes through the fifty-ninth position, or when a fast secondary is connected into the corrctive circuit just before the fifty-ninth minute after the hour, the maximum fast correction in these instances being equal in the number of minutes to the number of locking positions.

Various other modifications and changes in the timing, in the circuits and wiring, and in the apparatus above described, as well as changes in the sizes and proportions of the parts thereof, which will occur to those skilled in the art, may be effected without departing from the spirit of our invention, as defined by the following claims, and all statements regarding the operation of our invention are intended to be illustrative only and not limitations on the said claims.

We claim:

1. A corrective clock system comprising a master clock, a secondary clock in circuit therewith, means associated with said master clock for transmitting a series of non-locking impulses at regular intervals, means for transmitting a series of locking impulses at regular intervals, means for transmitting a series of locking impulses at shorter intervals, means associated with the secondary clock for locking it against further advance only during certain consecutive positions of the secondary, said means being responsive only to said locking impulses, and means to advance said secondary clock one step for every impulse received by it from said master clock except when said locking means is operated.

2. A time controlled system comprising a master clock, corrective secondary apparatus and non-corrective apparatus, a corrective secondary circuit including said corrective apparatus and a non-corrective secondary circuit including said non-corrective apparatus, means associated with said master clock for the transmission of minute impulses over both of said circuits, means for the transmission of a series of rapid impulses over said corrective circuit, and means automatically controlled by said master clock for opening said non-corrective circuit during the transmission of said rapid impulses.

3. A time controlled system comprising a master clock, corrective secondary apparatus and non-corrective apparatus, a corrective secondary circuit including said corrective apparatus and a non-corrective secondary circuit including said non-corrective apparatus, a common supply circuit for both of said secondary circuits, means to energize said supply circuit at intervals of one minute, means to energize said supply circuit at more frequent intervals, a relay for controlling the energization of said supply circuit at more frequent intervals, and contacts in said non-corrective circuit operated by said relay for opening said non-corrective circuit when said supply circuit is energized at said frequent intervals.

4. In a clock system, a master clock and means controlled thereby for the transmission of sixty minute impulses and a number of rapid impulses each hour, said rapid impulses and a minor portion of said minute impulses being locking impulses, a secondary clock adapted to be advanced one minute by each of said impulses, locking means to render said secondary inoperative during the transmission of said rapid impulses when said secondary is in chronological synchronism with said master clock, and means to render said locking means inoperative for periods exceeding one hour so that when said secondary is slow with respect to said master clock by an amount exceeding the maximum hourly correction and not exceeding a predetermined maximum cumulative correction, the correction will be cumulative from one hour to the next.

5. A time controlled system comprising a a master clock, secondary apparatus, means to transmit to said secondary normal polarity minute impulses, reversed polarity minute impulses, and reversed polarity rapid impulses, means in said secondary apparatus to advance the same step by step through consecutive minute positions in response to said impulses, means in said secondary apparatus to lock the same against advance by said impulses only when said secondary is in one of a relatively few consecutive predetermined locking minute positions, said locking means being operated only by said reversed polarity impulses, said transmitting means being controlled by said master clock to effect transmission of said rapid reversed polarity impulses immediately subsequent to the last minute reversed polarity impulses and during the first of said consecutive locking minute positions of said secondary apparatus when said secondary and said master clock are in on time relationship.

6. In a time controlled system, a master clock having a cycle of operation comprising the transmission of sixty minute impulses of which the major portion are non-locking and a minor portion are locking impulses, and a plurality of rapid locking impulses succeeding the transmission of said locking minute impulses, and a secondary unit having a cycle of operation during the major portion of which said secondary unit is adapted to be advanced step by step by either locking or non-locking impulses and during the minor portion of which cycle said secondary unit is adapted to be advanced step by step only by non-locking impulses, the timing of said cycles of operation being such that when said master apparatus and said secondary unit are in chronological synchronism said minor portion of said cycle of operation of said secondary unit begins immediately subsequent to the last locking minute impulse transmitted by said master apparatus.

7. Time controlled system comprising master apparatus and secondary apparatus, means for transmitting a distinctive type of impulse during a corrective period determined by said master apparatus and for a portion of the non-corrective period immediately preceding said corrective period, and means incorporated in said secondaries for locking the same against chronological advancement only during that particular portion of its cycle of operation corresponding to said corrective period when said master and said secondary apparatus are in chronological synchronism with each other and during a portion of the non-corrective period immediately succeeding said corrective period, said locking means being operated by the receipt by said secondary of said distinctive type of impulses transmitted thereto by said master apparatus.

8. A time controlled system comprising a master clock and a secondary clock, means controlled by said master clock for the transmission of minute impulses and rapid impulses to said secondary, a majority of the minute impulses being non-locking impulses and a minority of the minute impulses and all of the rapid impulses being locking impulses, the locking impulses all being consecutive and the rapid impulses being transmitted during the minute succeeding the last locking minute impulse, means in said secondary for advancing the same one minute upon the receipt of each impulse, locking means associated with said advancing means and responsive to the receipt of locking impulses only to render said advancing means inoperative, and means for blocking the action of said locking means in certain positions of said advancing means, there being at least one position of said blocking means wherein said locking means may function to render inoperative said advancing means, said blocking means blocking the action of said locking means for continuous periods exceeding one hour in duration when the slow error between said secondary and said master clock exceeds in number of minutes the number of said rapid impulses and is less than a predetermined maximum cumulative correction of at least thirty minutes.

9. Master apparatus comprising means to transmit an impulse every minute, time controlled means to transmit a series of rapid impulses at a predetermined time during each cycle of operation of said master apparatus, time controlled means to automatically reverse the polarity of said rapid impulses and of a minor portion of said minute impulses immediately preceding the transmission of said rapid impulses, and manually controlled means for transmitting rapid impulses and for simultaneously rendering inoperative said polarity reversing means at any time during said cycle of operation.

10. In combination with a time system having a corrective circuit and a non-corrective circuit, a program instrument comprising a corrective secondary apparatus in parallel with said corrective circuit, contacts actuated by said secondary apparatus and adapted to be closed at predetermined times, a signal circuit, a relay for controlling the operation of said signal circuit, said relay being in parallel with said non-corrective circuit and in series with said contacts, a holding circuit for said relay, a source of direct current for said holding circuit, an A. C. circuit controlled by said relay, a heating element in said A. C. circuit, and a thermal circuit breaker associated with said heating element and adapted to break said holding circuit.

11. In combination with impulse transmitting means for the transmission of minute impulses and rapid impulses, a program instrument comprising a signal circuit, means for closing said circuit at predetermined times, said means comprising a relay in series with contact mechanism and in parallel with said impulse transmitting means, and said contact mechanism being operated by a corrective secondary apparatus in parallel with said impulse transmitting means, and means for opening the circuit between said relay and said impulse transmitting means during the transmission of said rapid impulses.

12. A secondary apparatus comprising time indicating means, electromagnetic means, including an armature for advancing said time indicating means, locking means responsive to the energization of said electromagnetic means for locking said armature to prevent the advance of said time indicating means by said electromagnetic means, and a resilient member associated with said locking means and adapted to yield whereby said time indicating means may be advanced manually without unlocking said armature.

13. A secondary apparatus comprising time indicating means, a ratchet wheel associated therewith, a pawl for advancing said ratchet wheel, an electromagnet adapted to be energized by impulses, an armature for cooperation with said electromagnet, said armature being associated with said pawl, locking means adapted to be moved into engagement with said armature to prevent operation of the same, a rotatable member associated with said ratchet wheel and driven thereby at a lower rate of speed than that at which said ratchet wheel rotates, and means associated with said rotatable member to prevent operation of said locking means during certain positions of said rotatable member.

14. Secondary apparatus comprising time indicating means, electromagnetic means to advance said time indicating means, said electromagnetic means including a reciprocable armature which may be operated manually to advance said time indicating means, locking means for preventing the advance of said time indicating means by said electromagnetic means and adapted to be displaced by said electromagnetic means from non-locking position to locking position and vice versa, a rotatable member driven by said electromagnetic means for preventing displacement of said locking means from non-locking to locking position during certain positions of said rotatable member, cam means associated with said rotatable member and said locking means whereby said rotatable member, by the rotation thereof, may cause displacement of said locking means from locking to non-locking position when rotated by manual operation of said reciprocable armature, and a resilient member associated with said locking means to permit manual operation of said armature when said locking means is in locking position.

15. In a secondary apparatus for use in a corrective time controlled system, a pawl and a ratchet wheel for advancing said apparatus step by step, a resilient member associated with said pawl for effecting the advance of said ratchet wheel, an armature associated with said pawl, an electromagnet cooperating with said armature and responsive to impulses of both normal and reversed polarity, said armature and said electromagnet cooperating to move said pawl in opposition to said resilient member, a second resilient member adapted to be moved into and out of engagement with said armature, said second resilient member exceeding said first resilient member in strength, an auxiliary pole piece for said electromagnet, a permanent magnet pivotally mounted to cooperate with said auxiliary pole piece, said permanent magnet being associated with said second resilient member whereby it will be actuated by an impulse of reversed polarity to cause engagement of said second resilient member with said armature and thereby rendering said first resilient member ineffective for advancing said ratchet wheel, and means to prevent the engagement of said second resilient member with said armature in certain positions of said apparatus.

16. A secondary apparatus for a corrective time system comprising time indicating means, electromagnetic means for advancing said time indicating means, means for locking said time indicating means against advance by said advancing means, and means for rendering said locking means inoperative in the majority of the chronological positions of said time indicating means in each cycle of its operation and for rendering said locking means operative in a relatively few consecutive chronological positions in each such cycle.

RICHARD L. LORENZ.
ERNEST S. OSTLER.
ADOLPH L. DENNISTON.

CERTIFICATE OF CORRECTION.

Patent No. 2,332,828. October 26, 1943.

RICHARD L. LORENZ, ET AL.

It is hereby certified that error appears in the printed specification of the above numbered patent requiring correction as follows: Page 3, first column, line 23, for "non-corrosive" read --non-corrective--; page 5, second column, line 26, for "discs" read --disc--; page 6, first column, line 14, for "de-energiaztion" read --de-energization--; line 56, for "305 is" read --303 is--; and second column, line 29, for "betwen" read --between--; line 50, for "postioned" read --positioned--; and that the said Letters Patent should be read with this correction therein that the same may conform to the record of the case in the Patent Office.

Signed and sealed this 14th day of March, A. D. 1944.

Leslie Frazer (Seal)  Acting Commissioner of Patents.